United States Patent

[11] 3,633,447

| [72] | Inventor | Darrell F. Casida |
| | | Hobart, Okla. |
| [21] | Appl. No. | 848,037 |
| [22] | Filed | Aug. 6, 1969 |
| [45] | Patented | Jan. 11, 1972 |
| [73] | Assignee | M. L. Hart |
| | | Hobart, Okla. |

[54] CUTTING APPARATUS
5 Claims, 7 Drawing Figs.

[52] U.S. Cl................................................. 83/8,
83/9, 83/12, 83/477, 83/484, 83/487, 83/508, 83/578
[51] Int. Cl. ......................................................... B23d 19/00
[50] Field of Search............................................ 83/12,
484–489, 8, 9, 578, 471, 477, 508

[56] References Cited
UNITED STATES PATENTS

| 2,374,281 | 4/1945 | Gheen............................ | 83/487 |
| 2,378,428 | 6/1945 | Odian............................ | 83/487 |
| 2,610,688 | 9/1952 | Overman......................... | 83/488 X |
| 2,823,749 | 2/1958 | Chamberlain................... | 83/484 |
| 3,146,926 | 9/1964 | Huffman et al................. | 83/12 X |
| 3,181,406 | 5/1965 | Sayles........................... | 83/488 X |
| 2,605,840 | 8/1952 | Parker........................... | 83/488 X |

FOREIGN PATENTS

| 619,648 | 5/1961 | Great Britain................ | 83/487 |

*Primary Examiner*—James M. Meister
*Attorney*—Dunlap, Laney, Hessin & Dougherty ABSTRACT: Apparatus for cutting sheets of metal including a vertically extending framework having a continuous chain extending over a plurality of sprockets and secured to a cutting element for driving the cutting element in a horizontal path along the length of the framework. Brackets are provided on the framework in a horizontal plane immediately beneath the cutting member for supporting a sheet of metal to be cut along a line across the sheet. One of the sprockets over which the chain is passed is driven by a belt drive from a motor mounted on the framework, such motor being reversible, and being connected in an electrical circuit which includes switches suitable for energizing, deenergizing and reversing the motor. The cutting element employed is a disk of hard metal carried at the outer end of a lever arm which is pivoted about a horizontal axis to raise or lower the disk. A spring element tending to raise the arm from its cutting position is opposed by a threaded shaft which can be directed against a second arm connected to the lever arm carrying the disk to force the disk against the top of a sheet of metal to be cut.

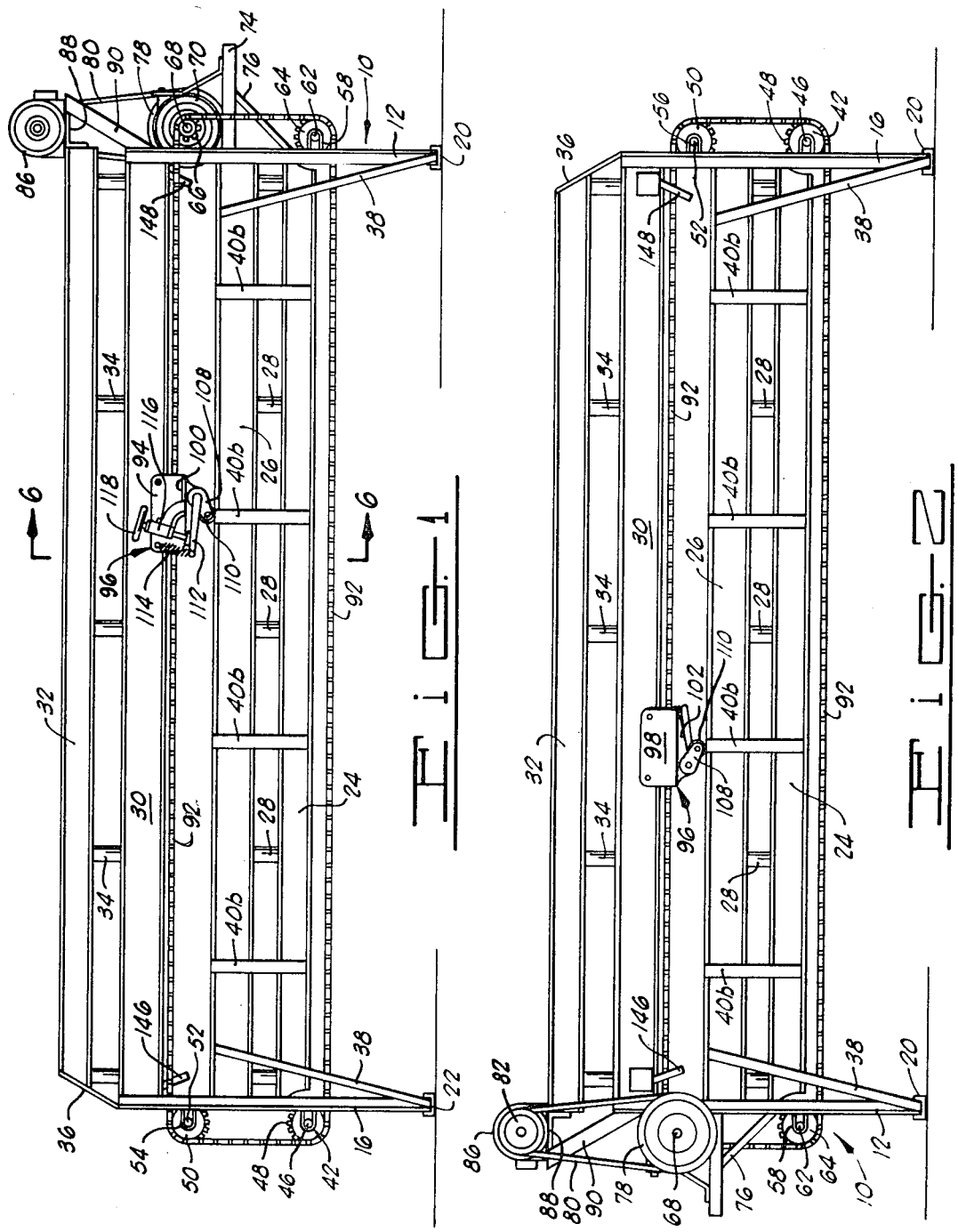

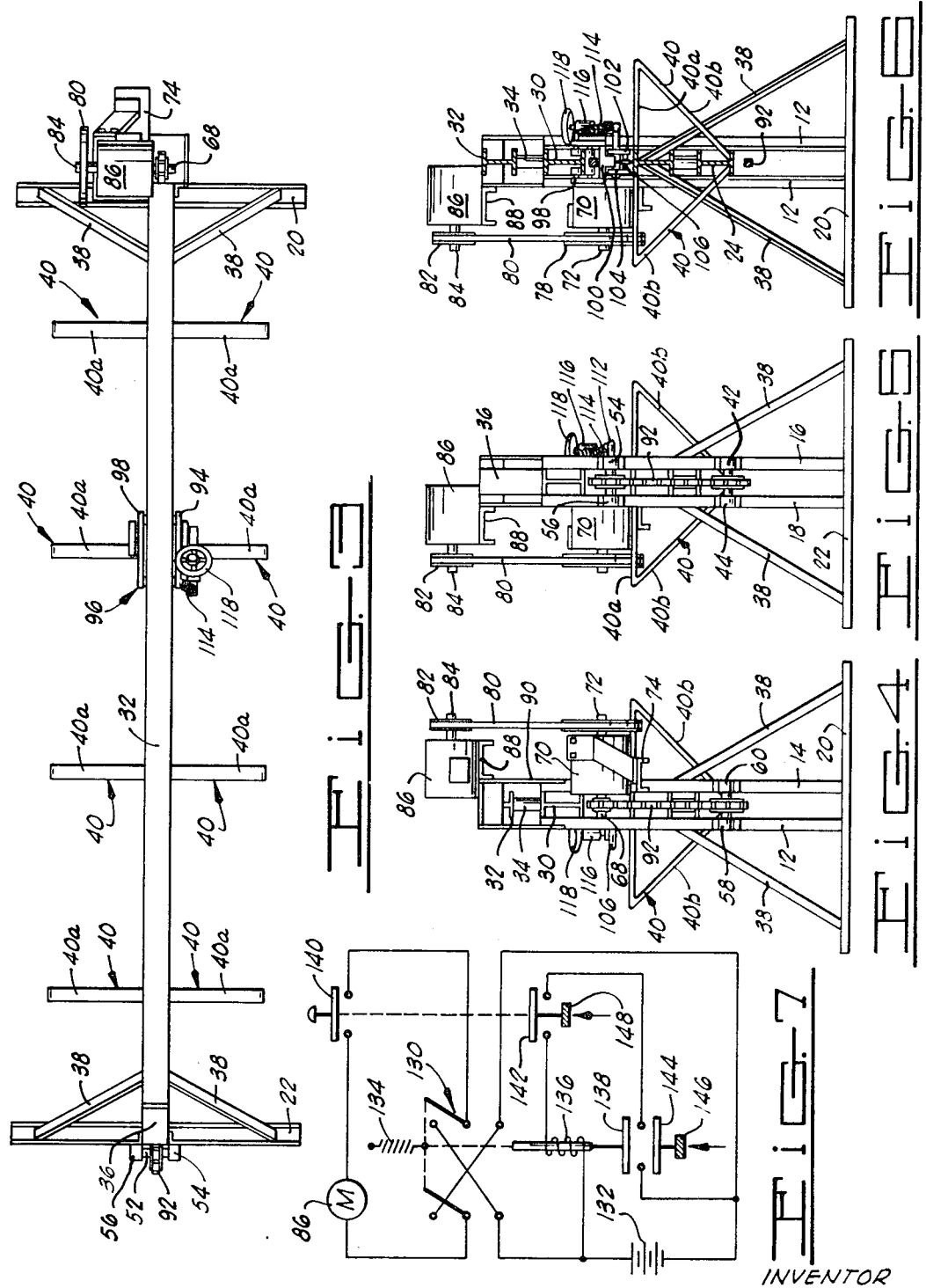

CUTTING APPARATUS

BACKGROUND OF THE INVENTION

1. Field of the Invention

This invention relates to devices for cutting sheets of metal, and more particularly, relates to apparatus for cutting along a line across a sheet of metal to sever the metal at such line.

2. Brief Description of the Prior Art

A number of prior proposals have been advanced for cutting a sheet of metal in a rapid and efficient manner. Among such proposals are those which provide a heavy, vertically reciprocating shearing blade which strikes the metal sheet along a line in an exposed surface, and shears the metal sheet as the descending blade cuts through the metal in a guillotine type action. There have also been proposed machines for cutting a sheet of metal by moving a scoring or cutting member across the surface of the metal along a line where the cut is to be made with one or more reciprocating strokes so as to sever the metal at this location. Among proposals of this type may be mentioned that which is depicted and disclosed in Gheen U.S. Pat. No. 2,374,281.

BRIEF DESCRIPTION OF THE PRESENT INVENTION

The present invention constitutes an improvement over those types of devices for cutting sheets of metal by causing a cutting element to move in a horizontal direction across the surface of the metal sheet in one or more reciprocating strokes to sever the metal along the line of reciprocation. Broadly described, the present invention comprises a vertically extending framework, a plurality of sprockets mounted on said framework and drivingly engaging a drive chain. The drive chain is connected to a cutting element so as to move this cutting element horizontally along the framework. All of the sprockets except one are idler sprockets, and the one sprocket is driven from a suitable motor mounted on the framework, preferably through a belt drive. Secured to the framework at a location to form a supporting platform for the workpiece are a plurality of braces. The workpiece is supported on these braces and a portion of the framework immediately below the cutting element which is employed, so that the workpiece is subjected to cutting contact by the cutting element as it is reciprocated.

The cutting element utilized is a disk of hardened metal having a sharpened peripheral edge, which disk is carried at the outer end of a lever arm. Another arm extends from the lever arm and is biased by a spring in a direction to urge the lever arm upwardly with respect to the workpiece at all times. The resilient bias of the spring is opposed by a threaded adjusting screw which can be threaded downwardly against the spring biased arm to force the lever arm downwardly, and thus to also force the disk forming the cutting instrumentality downwardly against the sheet which is to be cut.

A major object of the invention is to provide a reliable and highly efficient cutting device for cutting sheets of metal along a desired line.

Another object of the invention is to provide a device for cutting sheet metal along a desired line, which device is simple and inexpensive in its construction, yet is mechanically strong and has a trouble-free service life.

A further object of the invention is to provide a device for cutting sheets or panels of metal along a predetermined line, which device includes a removable cutting element which may be quickly replaced, or may be removed from the machine for repairs when desired.

Additional objects and advantages of the invention will become apparent from the following detailed description of the invention when such description is considered in conjunction with the accompanying drawings which illustrate the invention.

BRIEF DESCRIPTION OF THE DRAWINGS

FIG. 1 is a front side elevation view of the cutting apparatus of the invention.

FIG. 2 is a rear side elevation view of the cutting apparatus of the invention as it appears when viewed from the opposite side thereof from that which is seen in FIG. 1.

FIG. 3 is a top plan view of the cutting apparatus of the invention.

FIG. 4 is an end view of the cutting apparatus of the invention as it appears when viewed from one end thereof.

FIG. 5 is an end view of the cutting apparatus of the invention as it appears when viewed from the opposite end thereof from that which is shown in FIG. 4.

FIG. 6 is a sectional view taken along line 6—6 of FIG. 1.

FIG. 7 is an electrical wiring diagram showing electrical circuitry forming a part of the invention.

DETAILED DESCRIPTION OF A PREFERRED EMBODIMENT OF THE INVENTION

Referring to the drawings, and initially to FIG. 1 thereof, the cutting machine of the invention as illustrated therein includes a framework designated generally by reference numeral 10. The framework 10 includes a pair of vertically extending stanchions 12 and 14 (see FIG. 4) on one end of the framework, and a pair of vertically extending stanchions 16 and 18 on the other end of the framework. The stanchions 12 and 14 are secured at their lower ends to a horizontal runner 20 and the stanchions 16 and 18 are secured at their lower end to a horizontal runner 22. An elongated horizontally extending subbeam 24 has one of its ends secured between the stanchions 12 and 14 and its other end secured between the stanchions 16 and 18, and is spaced vertically from the lower end of the several stanchions. A main supporting beam 26 extends horizontally in the framework 10 and has one of its ends secured between the stanchions 12 and 14 and its opposite end secured between the stanchions 16 and 18. The main supporting beam 26 is connected to the subbeam 24 by a plurality of short supporting elements 28. It will be noted that both the subbeam 24 and main beam 26 are I-beams.

For the further strengthening and reinforcement of the framework 10, there is provided an intermediate beam 30 which is spaced vertically above the main beam 26 and has one of its ends secured between the stanchions 12 and 14 and its other end secured between the stanchions 16 and 18. A top beam 32 is spaced vertically from the intermediate beam 30 and is connected thereto by a plurality of connecting members 34. The top beam 32 has an inclined brace plate 36 secured between one of its ends and one end of the intermediate beam 30.

Extending upwardly from the outer ends of the runners 20 and 22 and having their upper ends secured to the main beam 26 are a plurality of diagonal braces 38. These are best illustrated in FIGS. 4–6 and it will be noted that the braces terminate with their upper ends located in the angle formed between the upper flange of the main beam 26 and the vertical web portion thereof. Spaced along the length of the framework 10 and secured between the main beam 26 and the subbeam 24 on the opposite sides thereof are a plurality of workpiece supporting braces 40. The workpiece supporting braces 40 are of generally V-shaped configuration and each includes a horizontally extending leg 40a which is horizontally aligned with the upper surface of the top flange of the main beam 26, and a diagonal leg 40b which is secured at its free end to the subbeam 24. The workpiece supporting braces 40 function to support, along with the main beam 26, a metal sheet or other workpiece which is to be cut utilizing the cutting machine of the present invention.

Secured to the stanchions 16 and 18 are a pair of journal blocks 42 and 44 which rotatably journal a shaft 46 to which is keyed an idler sprocket 48. Another idler sprocket 50 is disposed above the sprocket 48 and is keyed to a shaft 52 which is journaled in journal blocks 54 and 56. At the opposite end of the framework 10, a pair of journal blocks 58 and 60 are secured to the stanchions 12 and 14 and journal the opposite ends of a shaft 62 to which is keyed an idler sprocket 64.

A drive sprocket 66 is located in a vertical line above the idler sprocket 64 and is keyed to a shaft 68 which projects horizontally from a gear reducer box 70. The shaft 68 is connected through appropriate reduction gearing located in the gear reducer box 70 to an input shaft 72 which projects from the other side of the gear reducer box. The gear reducer box 70 is mounted upon a suitable horizontal supporting platform 74 which is secured to the vertical stanchion 14 and braced by a suitable brace 76. A pulley 78 is keyed to the input shaft 72 and is engaged by a drive belt 80. The drive belt 80 passes over a pulley 82 keyed to the output shaft 84 of a reversible electrical motor 86. The reversible electrical motor 86 is mounted on a suitable supporting platform 88 which is welded or otherwise suitably secured to one end of the top beam 32. A brace 90 is provided for further reinforcing and supporting the platform 88.

A flexible drive chain 92 is extended around the idler sprockets 48, 52 and 64 and around the drive sprocket 66. The opposite ends of the drive chain 92 are connected by suitable links (not visible) to a flange 94 forming a part of a cutting element designated generally by reference numeral 96. The cutting element 96 includes a carriage formed by the flange 94, which extends vertically to one side of the intermediate beam 30, a corresponding flange 98 which extends vertically on the opposite side of the intermediate beam 30 from the flange 94, and a horizontal web flange 100 (see FIGS. 1 and 6) which interconnects the vertically extending flanges 94 and 98 and extends beneath the intermediate beam 30.

Secured to the lower side of the web flange 100 are a pair of substantially horizontally extending journal brackets 102 and 104 which journal a shaft 106 to which a pair of horizontally spaced, substantially parallel lever arms 108 are connected. At their outer ends, the lever arms 108 journal between them, a disk-shaped cutting wheel 110 which has a sharpened outer peripheral edge and is made of very hard metal, such as tungsten carbide or a suitable steel alloy. Secured to one end of the shaft 106 is an actuating arm 112 which projects in a general horizontal direction and has its outer end connected to one end of a spring 114 which is secured at its opposite end to the vertically extending flange 94. Rigidly mounted in any suitable manner on the outside of the vertically extending flange 94 (that is, on the opposite side of this flange from the intermediate beam 30) is an adjustable screw barrel 116. The adjustment screw barrel 116 has an internal thread which receives the threaded shank of an adjustment screw 118. At its upper end, the adjustment screw 118 carries a handle, and its lower end bears against a flat formed on the upper side of the actuating arm 112.

The electrical circuit utilized in the present invention is illustrated in FIG. 7. In the circuit employed, the electric motor 86 is connected through a reversing switch 130 to a suitable source of electrical current 132. The reversing switch 130 is biased by a spring 134 to one position of closure in which current flows in one direction through the windings of the motor to cause the motor to rotate in one direction. A relay 136 is provided which, when energized, overcomes the spring 134 and throws the reversing switch 130 to an alternate position so that current flow is reversed through the motor 86 reversing its direction of rotation.

A holding switch 138 is connected to the relay 136 and closes a circuit in parallel with the motor circuit when the relay is energized. A main switch 140 is provided in the motor circuit and is mechanically connected to a switch 142 in series with the relay 136 so that both the switches 140 and 142 are opened and closed simultaneously. Finally a switch 144 having a mechanical contact element 146 is provided in the relay circuit. A similar mechanical contact element 148 is provided on the switches 104 and 142 for the purpose of opening both of these switches as hereinafter described. The mechanical contact element 146 projects into the path of the cutter element 96 adjacent the stanchions 16 and 18, and the mechanical contact element 148 projects into the path of the cutter element adjacent the stanchions 12 and 14.

OPERATION

In using the metal cutting machine of the invention, a flat substantially monoplanar workpiece, such as a large expanse of sheet metal, is placed in position for cutting by laying the workpiece in a horizontal position atop the main beam 26 and the workpiece supporting braces 40. The workpiece can be placed in this position without interference by the cutting element 96 by elevating the cutting wheel 110 so as to provide a space between it and the top flange of the main beam 26. Elevation of the cutting wheel 110 is accomplished by screwing the adjusting screw 118 in the barrel 116 to permit the spring 114 to retract and draw the arm 112 upwardly. This in turn pivots the lever arms 102 and 104 upwardly to raise the cutting wheel and permit the workpiece to be passed thereunder. After the workpiece has been placed atop the main beam 26 and the workpiece supporting braces 40, its position is more precisely adjusted so that the line of travel of the cutting element 96 and, more specifically, the cutting wheel 110 over the surface of the workpiece will coincide with the line along which it is desired to cut the workpiece.

After this final adjustment of the position of the workpiece, the cutting element 96 is again manipulated to force the cutting wheel 110 down against the upper surface of the workpiece. This is accomplished by screwing the adjusting screw 118 downwardly in the adjusting screw barrel 116 so that the lower end of the adjusting screw bears against, and forces downwardly, the arm 112. This will effect the downward pivotation of the lever arms 108 to force the cutting wheel 110 against the upper surface of the workpiece with considerable pressure. When the cutting element 96 is thus adjusted to its cutting status, the reversible motor 86 is started by pushing the main switch 140. At this time, with the electrical circuitry used in a preferred embodiment of the invention, the cutting element 96 will be located adjacent one end of the top run of the drive chain 92, and preferably adjacent the vertically extending stanchions 12 and 14.

Energization of the motor 86 by closure of the main switch 140 will cause the drive sprocket 66 to be driven in one direction of rotation by the driving connection afforded by the belt 80 and the reduction gearing located in the gear box 78. As the sprocket 66 is driven in rotation, the drive chain 92 will be driven by this sprocket so that the cutting element 96 is caused to move across the framework 10 from the end at which the stanchions 12 and 14 are located toward the end at which the stanchions 16 and 18 are located. As the cutting element 96 is thus moved in translation across the frame 10, the cutting wheel 110 bears against the upper surface of the workpiece, scoring it deeply along the line where it is desired to cut the workpiece. In the case of relatively thin sheets of metal, the workpiece may be cut entirely through by this action of the cutting element 96. With thicker workpieces, however, only a deep indentation will frequently be made in the workpiece.

When the cutting element 96 approaches the opposite end of the framework 10 from that at which its travel originated, it will strike the mechanical contact element 146 which will close the switch 144. Since the switch 142 has already been closed with closure of the main switch 140, the circuit to the coil of the relay 136 is now closed and the relay is energized. This will throw the switch 130, and the polarity of the circuit in which the electrical motor 86 is located will be reversed, causing the electrical motor to reverse its direction of rotation. Simultaneously with the throwing of the switch 130, the switch 138 is closed, thus locking in the relay even after the mechanical contact element 146 is released.

Reversal in rotation of the motor 86 is transmitted to the drive sprocket 66 so that the direction in which the drive chain 92 is caused to move is also reversed. Thus, the cutting element 96 will reverse its movement, and will move back across the workpiece along the identical path which it has previously traversed. This will result in a further cutting of the workpiece along the same line, and will usually be sufficient to sever the workpiece along this line.

When the cutting element 96 has reached the point of its origin of travel, i.e., adjacent the vertically extending stanchions 12 and 14, it will strike the mechanical contact element 148 to open the switch 142 and deenergize the relay 136, and sill simultaneously open the switch 140 located in the electrical circuit to the motor 86, thereby opening the circuit to this motor and terminating the input of power to the sprocket 66. The travel of the cutting element 96 is thus arrested.

Although a preferred embodiment of the invention has been herein described in order to provide an example of the manner in which the invention is constructed and used sufficient to enable those skilled in the art to practice the invention, it will be readily apparent that changes in the form and arrangement of structure which is depicted may be undertaken while continuing to rely upon the basic principles which are herein explained and which constitute the foundation for the invention. All changes and innovations of this type which continue to rely upon such basic principles are therefore deemed to be circumscribed by the spirit and scope of the invention.

I claim:

1. A cutting apparatus comprising:
   a framework including:
     a main beam extending from one end of the framework to the other;
     workpiece supporting braces extending horizontally from the main beam on opposite sides thereof; and
     an intermediate beam extending substantially parallel to, and spaced vertically from the main beam;
   a plurality of sprockets rotatably mounted on the framework;
   a reversible motor mounted on the framework and drivingly connected to one of said sprockets;
   a chain passed over such sprockets in engagement therewith;
   a cutting element, including:
     a carriage movably connected to the intermediate beam, having a portion thereof connected to the opposite ends of the chain and horizontally reciprocated thereby on the intermediate beam;
     a shaft journaly supported on the carriage;
     a pair of lever arms, one end of each lever arm connected to one end of the shaft, the pair of lever arms being journaly supported on the carriage via the shaft;
     a disc-shaped cutting wheel rotatably mounted between the lever arms;
     an actuating arm secured to the shaft, the actuating arm pivotally journaling the pair of lever arms to adjustably raise and lower the cutting wheel;
     a spring having one end connected to the carriage and the opposite end thereof connected to the actuating arm to draw the actuating arm upwardly to bias the cutting wheel from a cutting status; and
     an adjustment screw means adjustably connected to the carriage and having one end thereof engaging the actuating arm to adjustably force the actuating arm downwardly in one adjusted position of the adjustment screw means to force the cutting wheel into a cutting status; and
   electrical circuit means connected to said motor and responsive to reciprocation of said cutting element on the framework to reverse the direction of rotation of said motor when said cutting element is reciprocated to one side of the framework, and to terminate rotation of said motor in at least one direction when said cutting element is reciprocated to the opposite side of the framework.

2. A cutting apparatus as defined in claim 1 and further characterized to include:
   a drive belt drivingly connected to said electric motor; and
   speed-reduction gearing connected between said drive belt and said one sprocket.

3. A cutting apparatus as defined in claim 1 wherein said framework further includes:
   a first pair of vertically extending stanchions at one end of said framework, said first pair of stanchions journaling a pair of said sprockets in vertically spaced relation to each other, and secured to one end of said main beam; and
   a second pair of vertically extending stanchions at the end of said framework opposite said first-mentioned end thereof, said second pair of stanchions journaling a second pair of said sprockets in vertically spaced relation to each other, and secured to the opposite end of said main beam from that which is secured to said first pair of vertically extending stanchions.

4. A cutting apparatus as defined in claim 1 wherein the carriage is further defined to include:
   a pair of horizontally spaced, vertically extending flanges; and
   a horizontal web flange secured between the lower edges of said vertically extending flanges.

5. A cutting apparatus as defined in claim 4 wherein said framework further includes an intermediate beam extending substantially parallel to, and spaced vertically from said main frame, and being secured at its opposite ends to said first and second pairs of vertically extending stanchions, said intermediate beam extending between said vertically extending flanges for guiding said cutting element in its horizontal reciprocating movement.

* * * * *